(No Model.) 3 Sheets—Sheet 1.
F. MILLS.
VALVE FOR REGENERATIVE OR OTHER FURNACES.
No. 537,389. Patented Apr. 9, 1895.
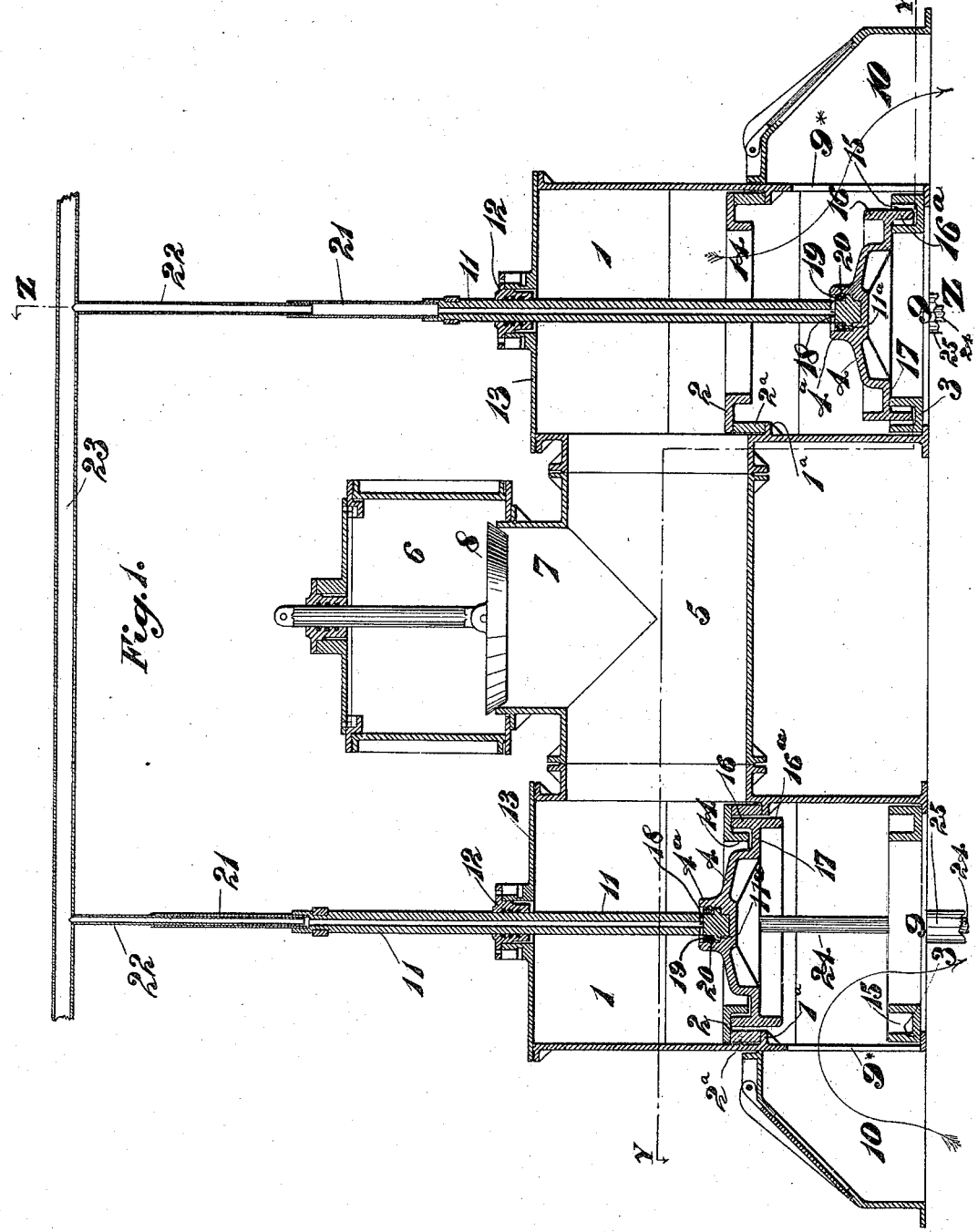
Witnesses.
Inventor,
Frederick Mills

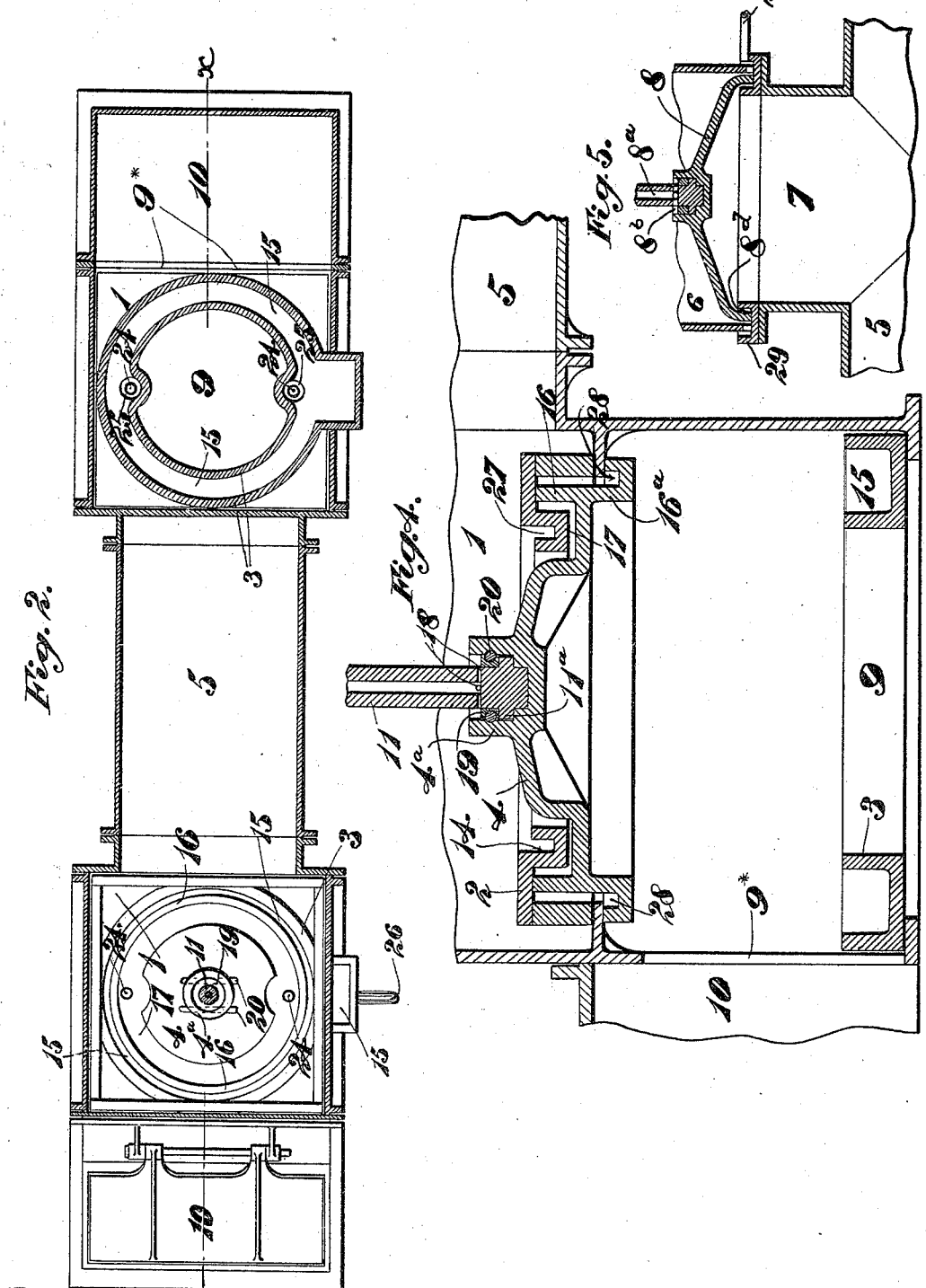

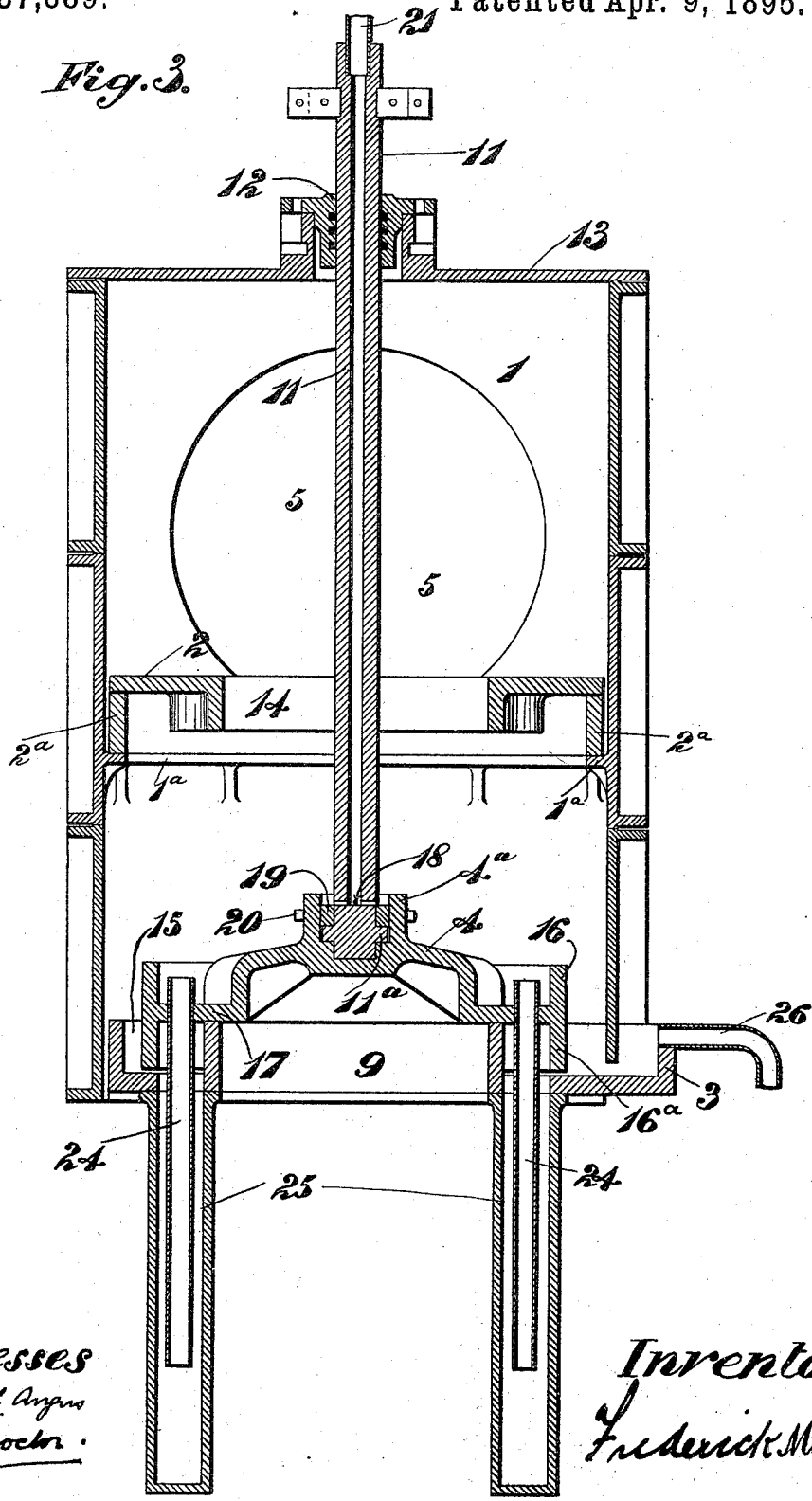

UNITED STATES PATENT OFFICE.

FREDERICK MILLS, OF STOCKTON-ON-TEES, ENGLAND.

VALVE FOR REGENERATIVE OR OTHER FURNACES.

SPECIFICATION forming part of Letters Patent No. 537,389, dated April 9, 1895.

Application filed September 5, 1894. Serial No. 522,200. (No model.) Patented in England December 12, 1893, No. 23,858.

*To all whom it may concern:*

Be it known that I, FREDERICK MILLS, a subject of the Queen of Great Britain and Ireland, residing at Stockton-on-Tees, in the county of Durham, England, have invented Improvements in Valves for Regenerative or other Furnaces, (for which a patent was granted in Great Britain the 12th day of December, 1893, bearing No. 23,858,) of which the following is a specification.

This invention has reference to improvements in valves for use in connection with regenerative and other furnaces, for the purpose of reversing the direction or controlling the flow of air and other gases.

Hitherto with valves of this kind, considerable difficulty has been experienced in obtaining perfectly gas tight joints between the valves and valve seats in each of the extreme positions of the valves, and an object of this invention is to obviate this difficulty. For this purpose the valves and the valve seats are according to this invention so constructed and arranged that the valves will be sealed in each of their extreme positions, the arrangement moreover being such as to render the valves durable and capable of being easily manipulated as I will now proceed to explain by reference to the accompanying drawings, in which—

Figure 1 is a longitudinal vertical section on the line $x\ x$ of Fig. 2, showing a pair of gas reversing valves and their connections according to this invention and suitable for use in connection with a regenerative gas furnace. Fig. 2 is a horizontal section on the line $y\ y$ of Fig. 1, the upper valve seat of the left hand valve being removed. Fig. 3 is a vertical section on the line $z\ z$ of Fig. 1. Fig. 4 shows, to a larger scale a vertical central section through a valve and its seats showing a modified construction. Fig. 5 is a central vertical section showing a modified construction of mushroom valve and seat.

Referring to Figs. 1 to 3 inclusive, 1, 1 are valve casings formed of any suitable material, such as cast or wrought iron, or steel, and each provided internally with upper and lower valve seats, 2 and 3 respectively, between which is arranged a vertically movable valve 4. The upper portions of the casings are connected by a passage 5 that is adapted to be placed in communication with a gas main 6, by a branch passage 7 controlled by a mushroom valve 8. The lower portion of each valve casing is provided with an opening 9, by which it can be placed in connection with a chimney, and with a lateral opening $9^\times$, and branch passage 10, by which gas or products of combustion, as the case may be, can pass to or from the corresponding furnace flue which is in connection with a pair of regenerators, as well understood.

With the arrangement above described, and assuming the valves 4 to be in the positions shown, and the mushroom valve 8 to be open, the gas can flow from the main 6 through the right hand casing 1, and lateral passage 10, to the furnace flue leading to one of the gas regenerators, while the hot products of combustion escaping through the other gas regenerator and furnace flue will pass through the left hand passage 10 and opening 9, and thence to the chimney; and upon reversing the positions of the valves, the direction of flow of the gas and products of combustion will also be reversed.

In the case of air reversing valves, the branch passage 7 would communicate with the external atmosphere, the communication being controlled by a suitable valve, and the two lateral passages 10 would be placed in communication by separate flues with the two air regenerators of a furnace. In other respects the set of air reversing valves would be similar in construction and work in the same way as the set of gas reversing valves. For a regenerative gas furnace, there would be a set of gas reversing valves, and a set of air reversing valves, similar to the gas valves except in the particulars mentioned.

To each of the valves 4, in each arrangement, the following description applies: The valve is carried by a spindle 11 that passes through a stuffing box 12 carried by the cover 13 of the corresponding casing 1. In order that the valve may make a gas tight joint with its seats 2 and 3 respectively these seats and valves are constructed as I will now explain. The upper valve seat 2 consists, in the example shown, of a square plate supported by cross bearers $2^a$, carried by ribs $1^a$ at the inner sides of the casing 1, and formed with a downwardly projecting annular rim or flange 14.

The lower valve seat 3, also consists, in the example shown, of a square plate formed with upwardly extending flanges that form, with the said plate, a practically annular trough 15. The valve 4 is provided on its upper side with an annular rim 16 that forms, with the valve body, a trough 17 adapted, when the valve is moved into its raised position, to receive the downwardly extending rim or flange 14 of the corresponding upper seat 2, as shown at the left hand side of Fig. 1. The valve is also provided at its lower side with a downwardly extending annular rim or flange $16^a$ that is adapted to enter the trough 15, in the corresponding lower seat 3, when the valve is moved into its lower position, as shown at the right hand side of Fig. 1. The valve, and the rims or flanges of the valve seats, instead of being of circular form in plan, may be of any other suitable form, for example, square.

To enable a gas tight joint to be made between either seat and the valve, the troughs 15 and 17 are charged with water, so as to form water seals for the rims or flanges 14 and $16^a$ respectively. For this purpose, the valve spindle 11 is made hollow, and at its lower end is formed with perforations 18, at a point just below the level of the top of the hollow central boss $4^a$ of the valve, which may be loosely connected to the spindle, by forming the lower end of the latter with a flange $11^a$, that is held within the said boss by a ring 19, fixed in place by pins 20, passing through recesses in the ring, and through holes in the boss.

To the outer end of the spindle, is attached a tube 21, arranged to slide telescopically over a branch pipe 22, connected to a water supply pipe 23. By this means water can be caused to flow, in all positions of the valve, down the hollow spindle 11, and evenly over the back or upper side of the valve thus preventing these parts from becoming unduly heated, the water flowing into the trough 17 so as to form a water seal with the rim or flange 14 of the upper seat 2, and produce a gas tight joint when the valve is in its raised position. From the trough 17 the water flows into the trough 15 of the lower seat, so as to form a water seal for the rim or flange $16^a$ of the valve, and produce a gas tight joint when the valve is in its lowered position. For this purpose the water may flow over the top edge of the rim or flange 16, but I prefer to provide the trough 17 in the valve with depending pipes 24, (Fig. 3,) the upper ends of which terminate slightly below the level of the top of the flange 16, and which extend downwardly through openings in the bottom of the trough 15 into somewhat larger tubes 25, having closed lower ends and secured to the under side of the said trough 15. By this means all splashing of the water is prevented. There might be only one such set of pipes 24, 25. A waste pipe 26 is provided to conduct away surplus water from the trough 15.

In the modified arrangement illustrated in Fig. 4, the rim or flange 14 of the upper seat 2 is formed with a trough 27, and the rim or flange $16^a$ of the valve is formed with an outwardly projecting trough 28, the arrangement being such that these troughs will become charged with water and offer an additional protection against damage by heat.

My invention may also be applied to the mushroom valve 8 for insuring, when it is in its closed position, a gas tight joint between it and its seat.

Fig. 5 shows a construction suitable for this purpose. The valve 8 is carried by a hollow spindle $8^a$ through which water is caused to pass, and thence flow through openings $8^b$, over the upper surface of the valve, into a stationary trough-shaped seat 29, into which takes a downwardly extending rim $8^d$ at the periphery of the valve when the valve is closed, the water finally flowing away from the said seat through an overflow pipe $26^a$.

Although I have shown a pair of valves 4 with seats, it will be obvious that in some applications, a single valve with upper and lower seats, constructed as described, might be used.

What I claim is—

1. A valve for regenerative and other furnaces, comprising a valve casing provided with internal upper and lower valve seats of which the former has a downward extension and the latter is formed as a trough, a vertically movable valve body arranged to work between said seats and provided at its upper side with a trough adapted to receive the downward extension of the upper seat, and at its lower side with a downward extension adapted to take into the trough in the lower seat and means for supplying water to the trough on said valve body and that in said lower valve seat substantially as herein described.

2. A valve for regenerative and other furnaces, comprising a valve casing provided with internal upper and lower valve seats of which the former has a downward extension and the latter is formed as a trough, a vertically movable valve body arranged to work between said seats and provided at its upper side with a trough adapted to receive the downward extension of the upper seat, and at its lower side with a downward extension adapted to take into the trough in the lower seat, and a water inlet pipe arranged to discharge water upon the upper side of said valve body substantially as herein described for the purpose specified.

3. A valve for regenerative and other furnaces comprising a valve casing with upper and lower valve seats of which the former has a downward extension provided with a water trough and the latter is formed as a trough, a vertically movable valve body arranged to work between said seats and provided at its upper side with a trough adapted to receive the downward extension of the upper seat and at its lower side with a downward extension formed with a trough and adapted to take into the trough in the lower seat, and a water inlet pipe arranged to discharge water upon the upper side of said valve body substantially as herein described.

4. A valve for regenerative and other furnaces, comprising a valve casing provided with internal upper and lower valve seats of which the former has a downward extension and the latter is formed as a trough, a vertically movable valve body arranged to work between said seats and provided at its upper side with a trough adapted to receive the downward extension of the upper seat, and at its lower side with a downward extension adapted to take into the trough in the lower seat, and a hollow spindle carrying said valve, formed with water exit openings at its lower inner end, and adapted at its outer upper end to be connected with a water supply pipe substantially as herein described.

5. A valve for regenerative and other furnaces, comprising a valve casing provided with internal upper and lower valve seats of which the former has a downward extension and the latter is formed as a trough, a vertically movable valve body arranged to work between said seats and provided at its upper side with a trough adapted to receive the downward extension of the upper seat, and at its lower side with a downward extension adapted to take into the trough in the lower seat, a water supply pipe arranged to discharge water upon the upper side of said valve body, and one or more overflow pipes carried by said valve body and adapted to convey water from the trough on the valve body to the trough in the lower seat substantially as herein described.

6. A reversing valve for regenerative furnaces, comprising two valve casings each in connection at one end with a gas or air inlet and at the other end with a furnace flue and with a chimney, and each provided with a depending upper valve seat, a lower trough shaped valve seat, and an intermediate valve formed with a trough to receive said upper valve seat and a depending projection to take into said lower valve seat, and means for supplying water to the upper side of each valve and lower valve seat substantially as herein described.

7. A reversing valve for regenerative furnaces comprising two valve casings adapted to be connected at one end with a gas or air inlet and at the other end with a furnace flue and with a chimney and each provided with upper and lower valve seats, a vertically movable valve body arranged to work between said seats and a hollow valve spindle formed with discharge openings at its inner end, a water supply pipe, and telescopic connections between said hollow spindles and water supply pipe, each of said upper seats being provided with a downward extension, each of said lower seats being formed as a trough, and each of said valve bodies being provided at its upper side with a trough adapted to receive the downward extension of the corresponding upper seat and at its lower side with a downward extension adapted to take into the trough in the corresponding lower seat substantially as herein described.

In testimony whereof I have signed my name to this specification in the presence of two subscribing witnesses.

FREDERICK MILLS.

Witnesses:
   GEO. THOS. ANGUS,
      8 *Cobden Street, Stockton-on-Tees.*
   H. PROCTOR,
      2 *Ropner Terrace, Stockton-on-Tees.*